UNITED STATES PATENT OFFICE.

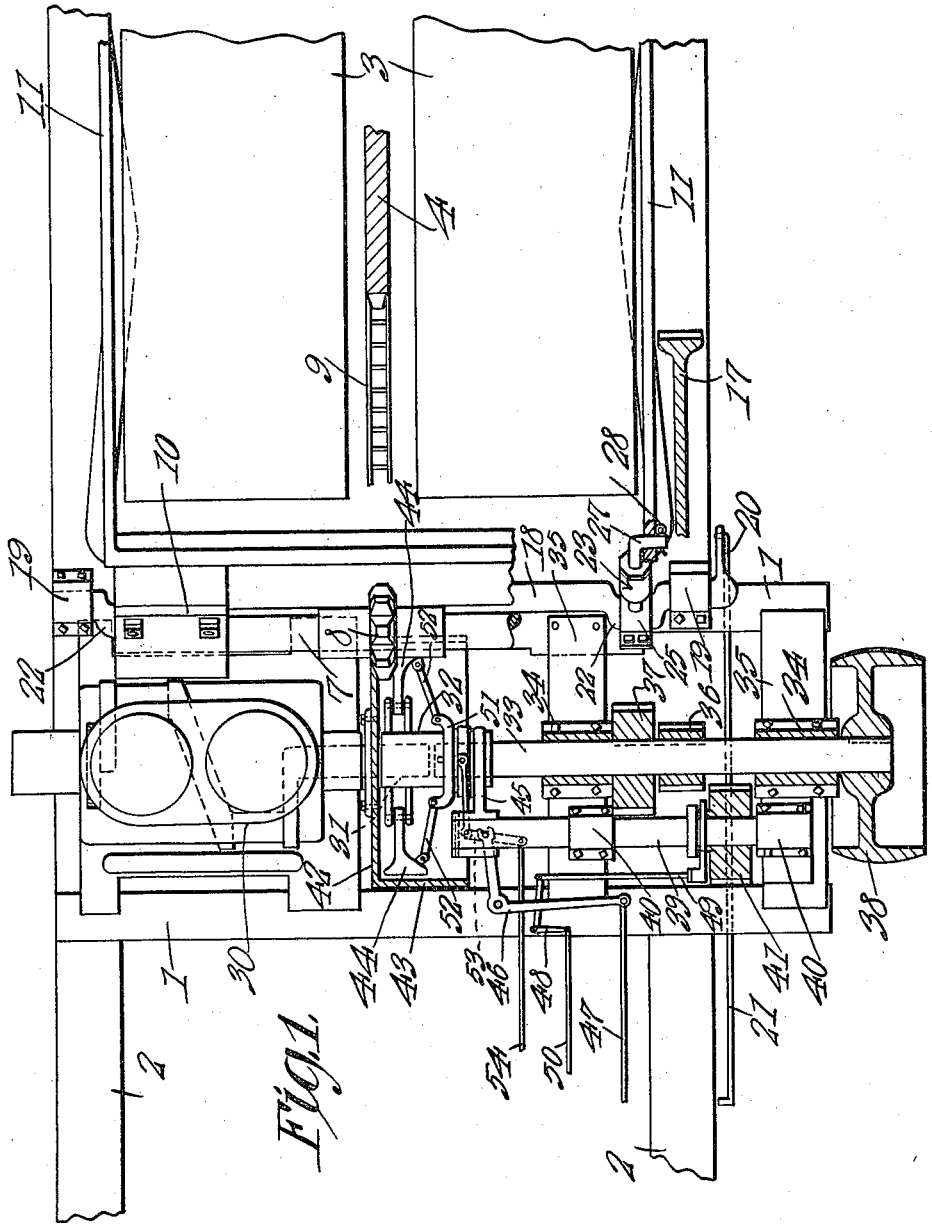

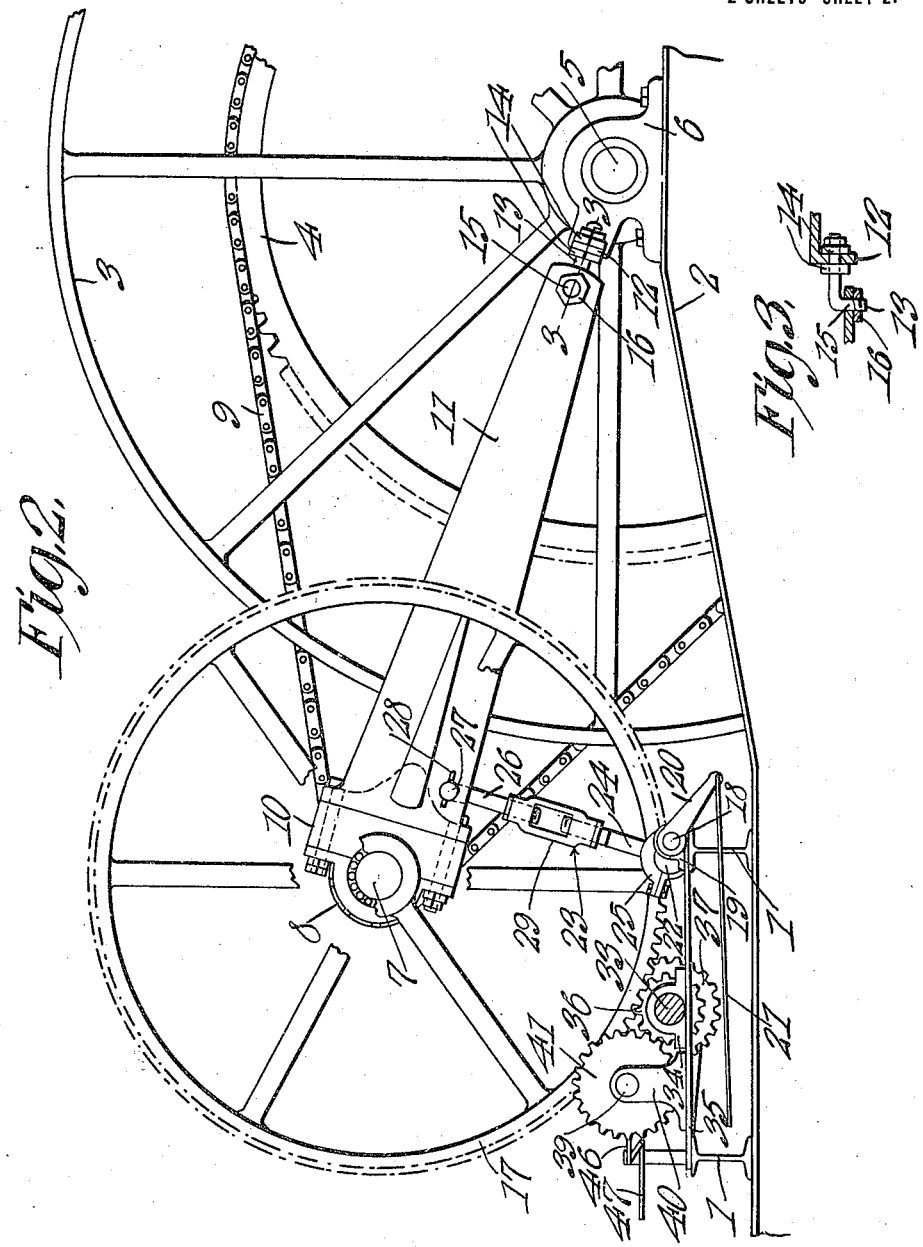

JOSEPH D. INGRAM, OF WASHBURN, TEXAS.

TRANSMISSION MECHANISM.

1,242,193. Specification of Letters Patent. Patented Oct. 9, 1917.

Application filed October 26, 1916. Serial No. 127,879.

*To all whom it may concern:*

Be it known that I, JOSEPH D. INGRAM, a citizen of the United States, residing at Washburn, in the county of Carson and State of Texas, have invented a new and useful Transmission Mechanism, of which the following is a specification.

The present invention appertains to power transmitting mechanisms, and aims to provide a novel and improved transmission mechanism adapted especially for use upon tractors, but also useful for various other machines.

The invention has for its object the provision of a change speed transmission mechanism for use upon tractors and other machines, the mechanism being of novel construction and embodying a novel assemblage of the component elements, whereby it is of especial utility and efficiency for its intended purposes, provision being made for different speeds as well as reverse speed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated, somewhat diagrammatically, in the accompanying drawings, wherein:—

Figure 1 is a plan view of the mechanism, portions being broken away and shown in section.

Fig. 2 is a side elevation, portions being broken away.

Fig. 3 is a sectional detail taken on the line 3—3 of Fig. 2.

The framework or supporting structure which may be of any suitable character, embodies, as illustrated, a pair of transverse beams 1 terminally secured upon longitudinal sills or frame members 2, between which the tractor wheels or wheels 3 are disposed as well as a relatively large sprocket wheel 4, the tractor or drive wheels and sprocket wheel 4 being journaled upon a transverse shaft 5 secured in suitable bearings 6 mounted upon the sills 2.

The sprocket wheel 4 and wheels 3 are operated from a transverse floating counter shaft 7 journaled in bearings 10 secured to the intermediate or yoke portion of a U-shaped frame or member 11 disposed astride the tractor or drive wheels 3 and having its terminals pivotally connected with the bearings 6. A relatively small sprocket wheel 8 is secured upon the shaft 7 and is connected by a suitable endless sprocket chain 9 with the sprocket wheel 4, whereby the wheels 3 and 4 will be rotated at a slower speed than the shaft 7.

In order to pivotally connect the terminals of the member 11 with the bearings 6, said bearings have outturned apertured ears 12 through which bolts 13 extend radially of the bearings, and clamping nuts 14 are threaded upon the bolts and bear against opposite sides of the ears 12 to clamp the bolts 13 in various adjusted positions. The bolts 13 are provided at those ends nearest the shaft 7 with outturned pintles 15 pivotally engaging through apertures in the terminals of the member 11, to provide for said member, and nuts 16 or other suitable retaining elements are engaged upon the pintles 15 to hold the parts assembled.

A relatively large gear wheel 17 is secured upon one end of the counter shaft 7 to mesh with other gears as will hereinafter more fully appear.

As a means for raising and lowering the member 11 and shaft 7, a transverse rock shaft 18 is journaled in bearings 19 secured upon the beam 1 nearest the tractor wheels or driven element, and an arm 20 is secured to one end of the tractor shaft and has a rod or link 21 connected thereto and adapted for connection with a hand lever, handle, or other manually operable member for reciprocating the rod 21 and oscillating the arm 20. The rock shaft 18 has a pair of cranks 22 near its opposite ends, which are connected by links 23 with the arms of the member 11. Each of said links embodies a lower section 24 having a bearing 25 embracing the respective crank 22, and an upper section 26 having an outturned end 27 pivotally engaging through the respective arm of the member 11, the same as the pintle 15, a cotter pin 28 or other retaining element being engaged with the end 27 to hold it assembled with the member 11. The adjacent ends of the sections 24 and 26 are connected by a turn buckle 29 for adjusting the length of the link.

An internal combustion engine 30 or other suitable prime mover is provided, the same being mounted upon the beams 1, and the terminal of its crank shaft 31 is received loosely by a sleeve 32 secured upon the end of a driving shaft 33 which is in alinement with the crank shaft, said sleeve 32 serving to hold the crank shaft and driving shaft 33 in alinement, and the sleeve being slidable upon the terminal of the crank shaft. The shaft 33 is journaled in bearings 34 carried by cross pieces 35 secured upon the beams 1, and gear wheels 36 and 37 of different diameters are secured upon the shaft 33 adjacent to one another between the bearings 34 and are shiftable longitudinally with the shaft 33 which is slidable in its bearings. A pulley wheel 38 is secured to the shaft 33 remote from the engine to connect the driving shaft by a belt with a machine or device to be driven by the engine.

A slidable shaft 39 is mounted in bearings 40 secured upon the cross pieces 35 at one side of the bearings 34, and a reversing gear wheel 41 is mounted loosely on the shaft 39 to slide and rotate relative thereto, the gear wheel 41 being movable or shiftable into and out of mesh with the gear wheel 36.

A fly wheel 42, also forming part of a clutch, is secured upon the terminal of the crank shaft 31 between the crank casing and sleeve 32, and is provided with a friction rim 43 projecting away from the engine and with which the clutch shoes 44 coöperate within the same, said clutch shoes being pivotally connected with the sleeve 32.

The shafts 33 and 39 are moved longitudinally in unison, and for this purpose, an arm 45 is secured to the shaft 39 and engages the sleeve 32, permitting said sleeve to rotate, but constraining the sleeve 32 and shaft 33 to move longitudinally with the arm 45 and shaft 39. The arm 45 can work in an annular groove with which the sleeve 32 is provided, or any other suitable swivel connection can be employed. The shaft 39 is shifted longitudinally by means of a bell crank lever 46 having its elbow fulcrumed upon the beam 1 remote from the tractor wheels, one arm of the lever 46 being engaged in any suitable manner with the shaft 39, and its other arm having a rod or link 47 connected thereto, said rod or link being adapted to be operated by a hand lever, handle or other manually operated member.

The reversing gear wheel 41 is shifted by means of a bell crank lever 48 having its elbow fulcrumed upon the same beam 1 as the lever 46, and one arm of the lever 48 is connected by a link 49 with the gear wheel 41, there being a suitable swivel connection between the link 49 and gear wheel. A rod or link 50 is connected to the other arm of the lever 48 to be operated by a hand lever, handle or other suitable manually operated member.

A clutch operating collar 51 is feathered or slidable upon the sleeve 32 and is connected by links 52 with the clutch shoes 44 whereby when the collar 51 is shifted longitudinally upon the sleeve 32, the shoes will be moved into and out of frictional engagement with the rim 43 to close and open the clutch. The collar 51 is shifted by means of a bell crank lever 53 having its elbow fulcrumed to the shaft 39 and having one arm connected by a swivel joint with the collar 51, while a rod or link 54 is connected to the other arm of the lever 53 to be operated by a hand lever, handle or other manually operated member.

It will be noted that the gear wheels 36 and 37 are carried by the same shaft 33 which carries part of the clutch, and as the shaft 33 is shifted, the shaft 39 is shifted therewith, to carry the clutch operating lever 53 with the sleeve 32, in order that the position of the clutch will not be disturbed even though the shaft 33 is moved, and the lever 53 can be operated at any position of the shafts 33 and 39, for operating the clutch. When the collar 51 is moved toward the fly and clutch wheel 42, the brake shoes 44 are moved outwardly into engagement with the rim 43, so that the shaft 33 will be rotated with the crank shaft of the engine, and when the collar 51 is moved away from the engine, the links 52 pull the shoes 44 away from the rim 43 to open the clutch.

To provide for low speed forward, the gear wheel 41 being moved out of the way, as seen in Fig. 1, the shaft 33 is shifted to bring the gear wheel 36 into the same plane as the gear wheel 17 to mesh therewith, whereby the shaft 7 is driven from the shaft 33 through the medium of the gear wheels 36 and 17, and the power is transmitted from the shaft 7 to the tractor or driving wheels by the roller sprocket chain 9. When the gear wheel 17 is in mesh with the gear wheel 36, the cranks or eccentrics 22 are moved to let the bearings 25 rest upon the respective beam 1, the member 11, counter shaft 7 and gear wheel 17 thus being permitted to move downwardly to bring said gear wheel into mesh with the gear wheel or pinion 36. To provide for the high speed of the tractor, the rod 21 is operated to rock the shaft 18, so that the cranks 22 are raised, thereby to raise the links 23 and member 11; thus raising the shaft 7 and removing the gear wheel 17 from the spur gear or pinion 36, so that the shaft 33 can be shifted longitudinally to remove the gear wheel 36 from the plane of the gear wheel 17 and move the gear wheel 37 into the plane of said gear wheel 17 and into mesh therewith. Now, the gear wheel 17 is driven from the gear wheel 37 instead of the gear wheel 36, to provide for the higher relative speed of the tractor. In order to reverse the driven element, the shaft 33 is shifted to remove the gear wheel 37 from the gear wheel 17 and bring the gear wheel 36 into the plane of the gear wheel 17, the rod 21 being operated to lower the gear wheel 17 slightly so that it is in a position to mesh with the reversing gear wheel 41, and the rod 50 is then operated to shift the gear wheel 41 into mesh with the gear wheels 36 and 17, whereby the gear wheel 17 is rotated from the gear wheel 36 through the intervention of the gear wheel 41, so that the gear wheel 17 and parts operated thereby will be rotated in the reverse direction.

It is to be noted that the clutch can be operated at any position of the gears, but it is necessary to open the clutch in order to shift the shaft 33 for changing or reversing the speed, since when the clutch shoes 44 are in frictional engagement with the rim 43, the sleeve 32, and consequently the shaft 33, cannot be shifted, since the shoes 44 will grip the rim 43 and prevent such movement of the shaft 33. When the shoes 44 are released from the rim 43, the clutch is open, and the shaft 33 can then be shifted to change the gears.

To operate a machine or other device from the pulley wheel 38, the gears are brought to a position illustrated in Fig. 1, and the gear wheel 17 is raised so as to be removed from the gear wheel 36, the shaft 33 being shifted toward the engine. Then when the clutch is thrown in, the shaft 33 will be rotated with the crank shaft to transmit power to the pulley wheel 38.

Having thus described the invention, what is claimed as new is:

1. A transmission mechanism embodying a pair of gears, one movable in the plane of rotation thereof to and from the other into and out of mesh therewith, and a third gear shiftable into mesh with the aforesaid gears when they are separated in said plane.

2. A transmission mechanism embodying a gear, a swinging member, means for swinging it, a gear carried by the swinging member to move into and out of mesh with the aforesaid gear, and a shiftable gear movable into and out of mesh with the first mentioned gear, the second mentioned gear being adapted to also mesh with the third mentioned gear when the second mentioned gear is out of mesh with the first mentioned gear.

3. A transmission mechanism embodying a rotatable and slidable shaft, a pair of gears carried thereby, a shiftable reversing gear shiftable into and out of mesh with one gear of said pair, and a gear mounted for movement toward and away from the aforesaid gears to mesh with any one of them.

4. A transmission mechanism embodying a wheel, a U-shaped member astride said wheel and having its terminals pivotally mounted, a counter shaft journaled to the yoke portion of said member, an operative connection between said counter shaft and wheel, a gear wheel carried by the counter shaft, a gear with which the gear wheel is adapted to mesh, and means for swinging said member.

5. A transmission mechanism embodying a wheel, a U-shaped member astride said wheel and having its terminals pivotally mounted, a sprocket wheel assembled with said wheel, a counter shaft journaled to the yoke portion of said member, a sprocket wheel carried by the counter shaft, a sprocket chain connecting said sprocket wheels, a gear wheel carried by the counter shaft, a gear with which said gear wheel is adapted to mesh, and means for swinging said member.

6. A transmission mechanism embodying bearings, a shaft secured to said bearings, a driver mounted on said shaft, a U-shaped member having its terminals pivotally connected to said bearings, a counter shaft journaled to the yoke portion of said member, an operative connection between said counter shaft and driver, a gear wheel carried by the counter shaft, a gear with which said gear wheel is adapted to mesh, and means for swinging said member.

7. A transmission mechanism embodying a swinging member, a gear wheel carried thereby, gears with which said gear wheel is adapted to mesh, a rock shaft, means for rocking said shaft, said rock shaft having an eccentric portion, and a link connecting said eccentric portion and swinging member.

8. A transmission mechanism embodying a pair of shafts, one for driving the other, a clutch for connecting said shafts, the last mentioned shaft being shiftable longitudinally for changing speed, and the clutch being operable when closed to prevent the shifting of the last mentioned shaft.

9. A transmission mechanism embodying a pair of alining shafts, one for driving the other, and the last mentioned shaft being shiftable longitudinally for changing speed, and a friction clutch for connecting said shafts and serving when closed to prevent the shifting of the last mentioned shaft.

10. A transmission mechanism embodying a clutch wheel, a shaft, said shaft and clutch wheel being shiftable toward and away from one another for changing speed, said clutch wheel having a rim, and means carried by said shaft for frictionally engaging said rim and when engaged therewith to prevent the relative movement of said shaft and wheel.

11. A transmission mechanism embodying a clutch wheel having a friction rim, a shaft movable toward and away from said wheel, a friction shoe carried by said shaft and movable into and out of engagement with said rim at various positions of the shaft, and means movable, with said shaft for bringing the friction shoe into and out of engagement with said rim, said shaft when shifted being adapted to change the speed of the mechanism.

12. A transmission mechanism embodying a pair of alining shafts, a sleeve secured upon the end of one and receiving the end of the other, the first mentioned shaft being shiftable longitudinally for changing speed, a clutch wheel secured to the second mentioned shaft and having a friction rim, a friction shoe connected to said sleeve to engage said rim, a collar slidable upon the sleeve for bringing the shoe into and out of engagement with said rim, a member slidable with said shaft, and operating means carried by said member and connected to said collar for shifting it at various positions of the first mentioned shaft.

In testimony that I claim the foregoing as my own, I have hereto affixed my signature in the presence of two witnesses.

JOSEPH D. INGRAM.

Witnesses:
V. C. NELSON,
F. L. THOMASON.

Copies of this patent may be obtained for five cents each, by addressing the "Commissioner of Patents, Washington, D. C."